Oct. 16, 1923.

L. J. BRULOTTE 1,471,097

PULLEY

Filed March 14, 1921

Inventor.
Leonidas J. Brulotte.
by H. J. S. Dennison
atty

Patented Oct. 16, 1923.

1,471,097

UNITED STATES PATENT OFFICE.

LEONIDAS J. BRULOTTE, OF TORONTO, ONTARIO, CANADA.

PULLEY.

Application filed March 14, 1921. Serial No. 452,001.

*To all whom it may concern:*

Be it known that I, LEONIDAS J. BRULOTTE, a subject of the King of Great Britain, and resident of the city of Toronto, county of York, Province of Ontario, in the Dominion of Canada, have invented certain new and useful Improvements in Pulleys, described in the following specification and illustrated in the accompanying drawings that form part of the same.

The principal objects of the invention are, to enable the ready placing of pulleys upon a shaft without disturbing the shaft, thereby effecting a great saving in time in the operation of a plant and enabling machines to be set up and brought into operation in very rapid manner.

A further object is to devise a construction of pulley which will automatically maintain itself tight upon the shaft without the use of keys so that it may be placed in any desirable position on the shaft.

The principal feature of the invention consists in the novel construction of the hub of the pulley whereby a sectional bushing is clamped in the hub by rotatable eccentric members and the pulley is maintained tight upon the bushing through the eccentric structure of the hub and bushing and whereby the outer structure is formed in sections adapted to be separated to allow of its being placed upon the shaft.

In the drawings, Figure 1 is an end elevational and part sectional view of a pulley showing the position of the parts with the outer structure free upon the bushing.

Figures 1, 2:
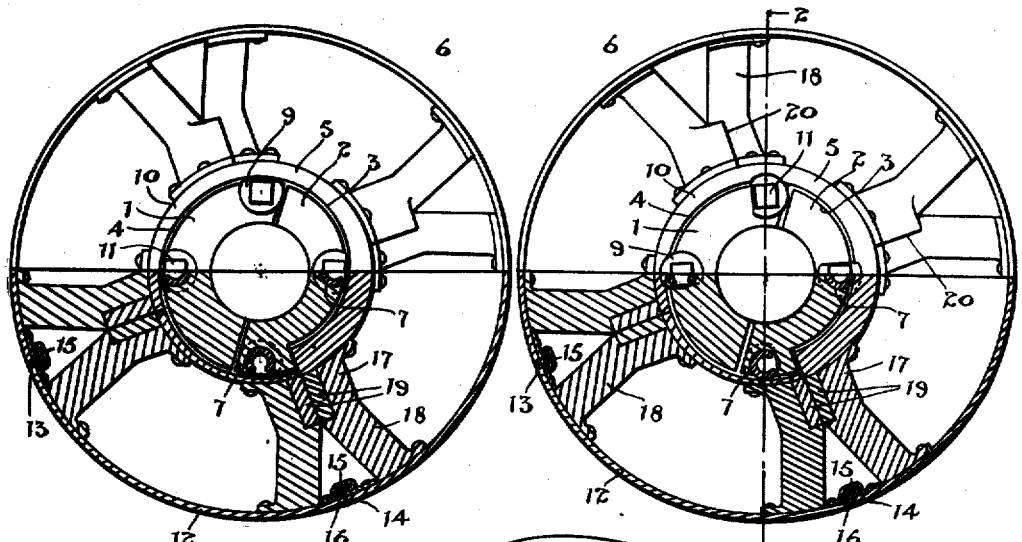
Figure 2 is a view similar to Figure 1 showing the hub and bushing clamped together.
Figures 3, 4:
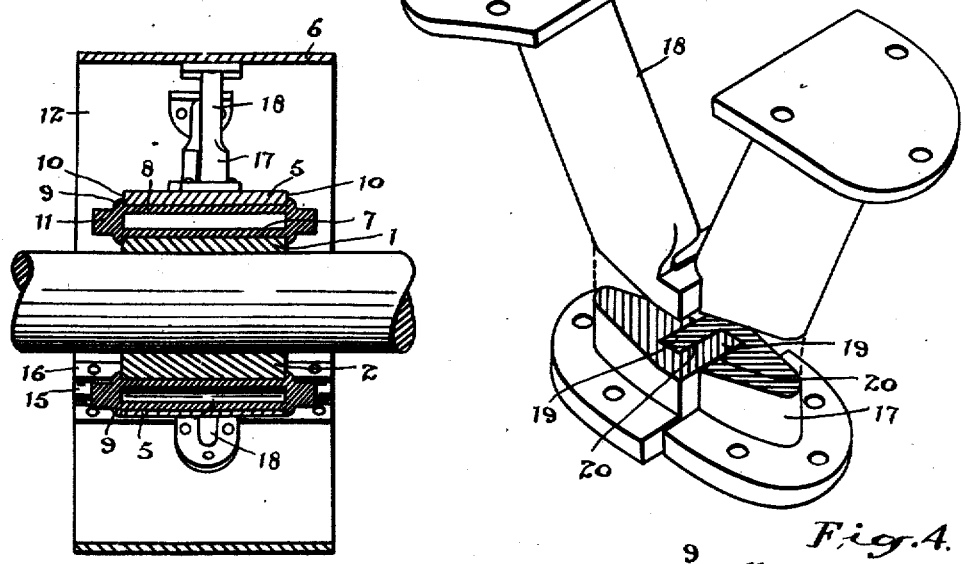
Figure 3 is a vertical sectional view through the line 2—2 of Figure 2.
Figure 4 is an enlarged perspective part sectional detail of one of the separable arms of the pulley.
Figure 5:
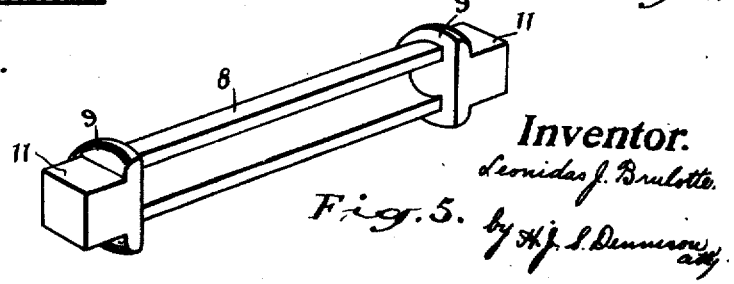
Figure 5 is an enlarged perspective detail of one of the clamping members.

The device as illustrated in the accompanying drawing consists of a bushing formed in sections 1 and 2 which are adapted to fit around the shaft. The periphery 3 of the said bushing is of an involute form and is adapted to enter the involute recess 4 in the hub 5 of the pulley 6.

The bushing members 1 and 2 are each provided with longitudinal cylindrical orifices 7 which intersect the involute periphery and these are arranged diagonally opposite when the bushing sections are placed together, one orifice being at one end of each of the bushing sections and the other being disposed about the middle of the curved periphery Within each of the orifices 7 is rotatably mounted a part cylindrical key member 8 provided with flanged heads 9 at each end, which flanges are adapted to overlap the end edge 10 of the hub 5 of the pulley. Each of these flanges are cut away at the side opposite to the flattened side of the key so that the pulley hub may be readily inserted over the bushing from either end. The keys are provided with squared extensions 11 beyond the flanges and when the pulley hub is in place the keys are rotated so that their cylindrical peripheral surfaces are brought into contact with the involute surface of the hub 5, thereby centering the hub and locking it.

Owing to the involute shape of the bushing and the hub it will be seen that the external portion of the pulley will automatically tighten itself upon the hub as the bushing will be arranged with the involute in the proper position according to the direction of rotation and according to whether the pulley is driving or driven but it will be readily understood that no matter how tight the pulley may be wedged upon the bushing by reason of the involute contact surface, such contact will only be with the key members 8 and it may be immediately released by the turning of these key members to bring their flat sides outward.

In order to enable the placing of the pulley on a shaft without disturbing the shaft bearings it is necessary to divide the rim section. The pulley rim 12 is divided transversely at two points 13 and 14 preferably being one-quarter of the circumference and on the inner side of the meeting edges of the rim are arranged the interlocking flange members 15 and 16 which slide together side-ways.

The spokes of the pulley are formed in interlocking sections, the shank 17 of each spoke section 18 having a longitudinal tongue 19 and adjacent groove 20 so that when the spoke members are brought together in a side direction by the slipping of the locking flanges 15 and 16 together, the radial tongues 19 enter the radial grooves 20 and the section of the pulley is thus firmly interlocked with the main portion.

In the use of this device the outer portion or rim structure has the movable section removed and the pulley is slipped over the shaft upon which it is to be secured. The removable section is then inserted by sliding the locking flanges 15 and 16 together and interlocking the shank members 17 and 18.

The bushing which is formed in half sections, being inserted within the hub of the rim section with the key members 8 arranged with their flat sides turned outward, the rim is then rotated so that the involute hub fits snugly upon the involute bushing and the key members 8 are then turned clamping the outer portion of the bushing and clamping the bushing firmly upon the shaft.

The involute structure of bushing and hub ensures a tightening force as the pulley is operated and the harder the pull upon the pulley the tighter it will grip.

It will be readily understood that no matter how tight the pulley may be on the shaft it may be readily loosened by the simple rotation of the members in the manner described as these support the outer portion at four points and they are readily turned to bring their flat sides outward, thus releasing the outer section from the inner.

A pulley such as described is very quickly assembled and will enable the installation of machinery to be effected in a very expeditious manner. It will also enable the changing of a pulley for a larger or smaller diameter without undue loss of time as it is simply necessary to remove the outer portion and replace it with a different size as all the hubs for a certain size of shaft will be made the same.

What I claim as my invention is:—

1. A pulley, comprising, a split bushing having an eccentric periphery, a plurality of cam shaped members carried by said bushing and projecting from the periphery thereof, and a hub having a cam-shaped internal perimeter adapted to lock upon said bushing in engagement with said cams.

2. A pulley, comprising, a split bushing having an involute shaped periphery, a plurality of cams adapted to project from the periphery of said bushing to be withdrawn inwardly, and a hub having an involute centre adapted to receive said bushing and to be supported by said cams.

3. A pulley, comprising, a split bushing having an involute perimeter and a plurality of longitudinal cylindrical recesses cutting the perimeter, cylindrical locking members with flattened sides and provided with end flanges and rotatably supported in said cylindrical recesses, and a hub having an involute opening to receive said bushing adapted to be engaged by said cylindrical members and held by the end flanges thereof from lateral displacement.

LEONIDAS J. BRULOTTE.